(12) United States Patent
Ando et al.

(10) Patent No.: US 7,224,555 B2
(45) Date of Patent: May 29, 2007

(54) DISC DRIVE SUSPENSION

(75) Inventors: Toshiki Ando, Yokohama (JP); Noriyuki Saito, Yokohama (JP); Masao Hanya, Yokohama (JP); Seiji Yamashita, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 371 days.

(21) Appl. No.: 10/898,525

(22) Filed: Jul. 22, 2004

(65) Prior Publication Data

US 2005/0030670 A1  Feb. 10, 2005

(30) Foreign Application Priority Data

Aug. 5, 2003  (JP) .............................. 2003-205990

(51) Int. Cl.
*G11B 5/48* (2006.01)
(52) U.S. Cl. ................................... 360/244.8
(58) Field of Classification Search ............... None
See application file for complete search history.

(56) References Cited

U.S. PATENT DOCUMENTS 6,768,613 B1 * 7/2004 Coon ...................... 360/244.8

2003/0011935 A1   1/2003  Saito et al.
2004/0240114 A1   12/2004 Takikawa et al.

FOREIGN PATENT DOCUMENTS

| JP | 2001-155458 A | 6/2001 |
| JP | 2002-133813 A | 5/2002 |
| JP | 2002-279745 A | 9/2002 |
| JP | 2003-151114 A | 5/2003 |

* cited by examiner

*Primary Examiner*—Robert S. Tupper
(74) *Attorney, Agent, or Firm*—Frishauf, Holtz, Goodman & Chick, P.C.

(57) ABSTRACT

A disc drive suspension has a base portion including a baseplate and a plate member, a load beam, a pair of hinge members, and a flexure with conductors. The flexure passes through a gap between the hinge members and ranges over the load beam and the base portion. A thin-walled portion is formed by partial etching on that region of a front end portion of the plate member of the base portion which faces the flexure. A thin-walled portion is also formed by partial etching on that region of a rear end portion of the load beam which faces the flexure.

3 Claims, 7 Drawing Sheets

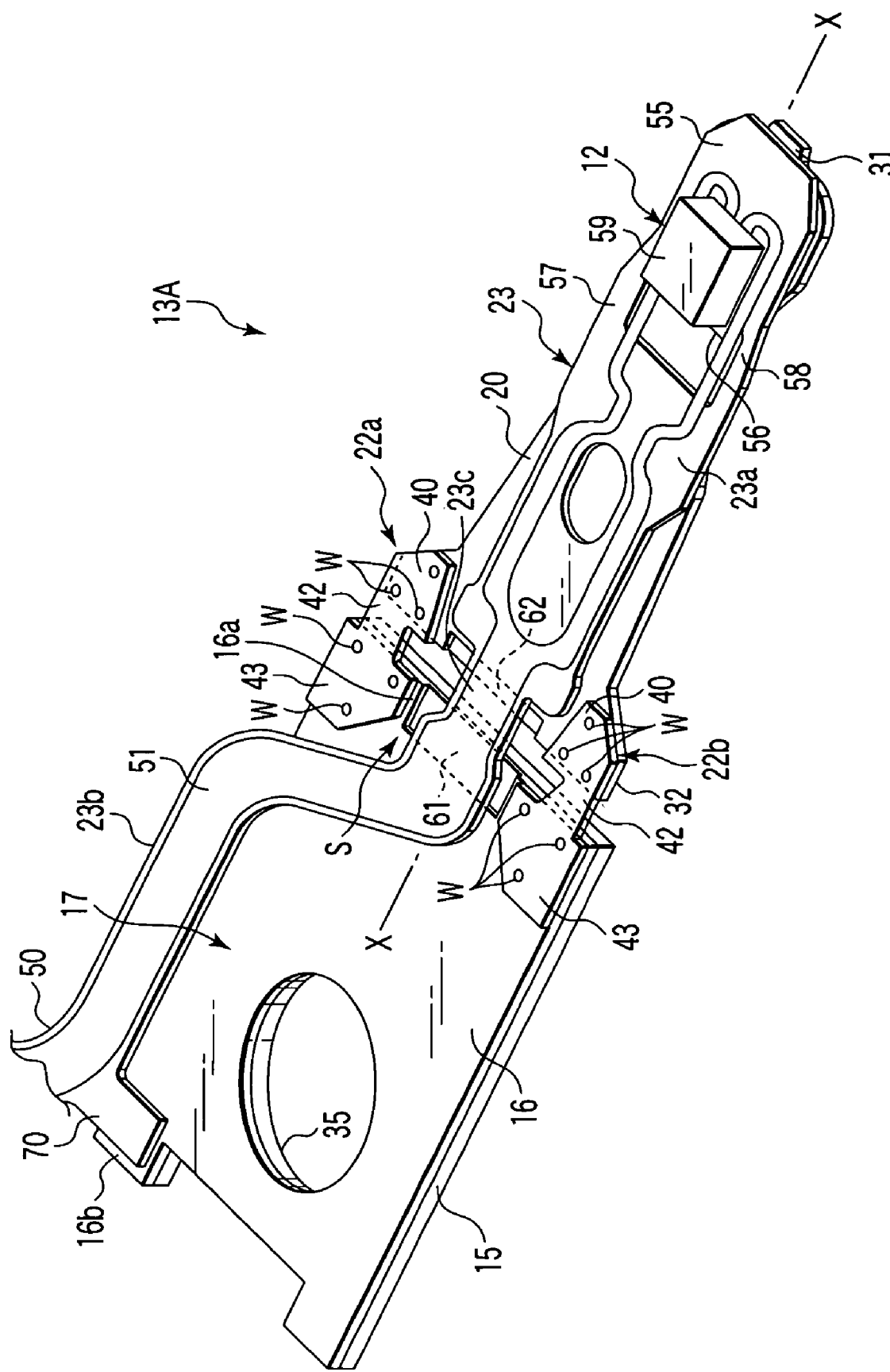
F I G. 1

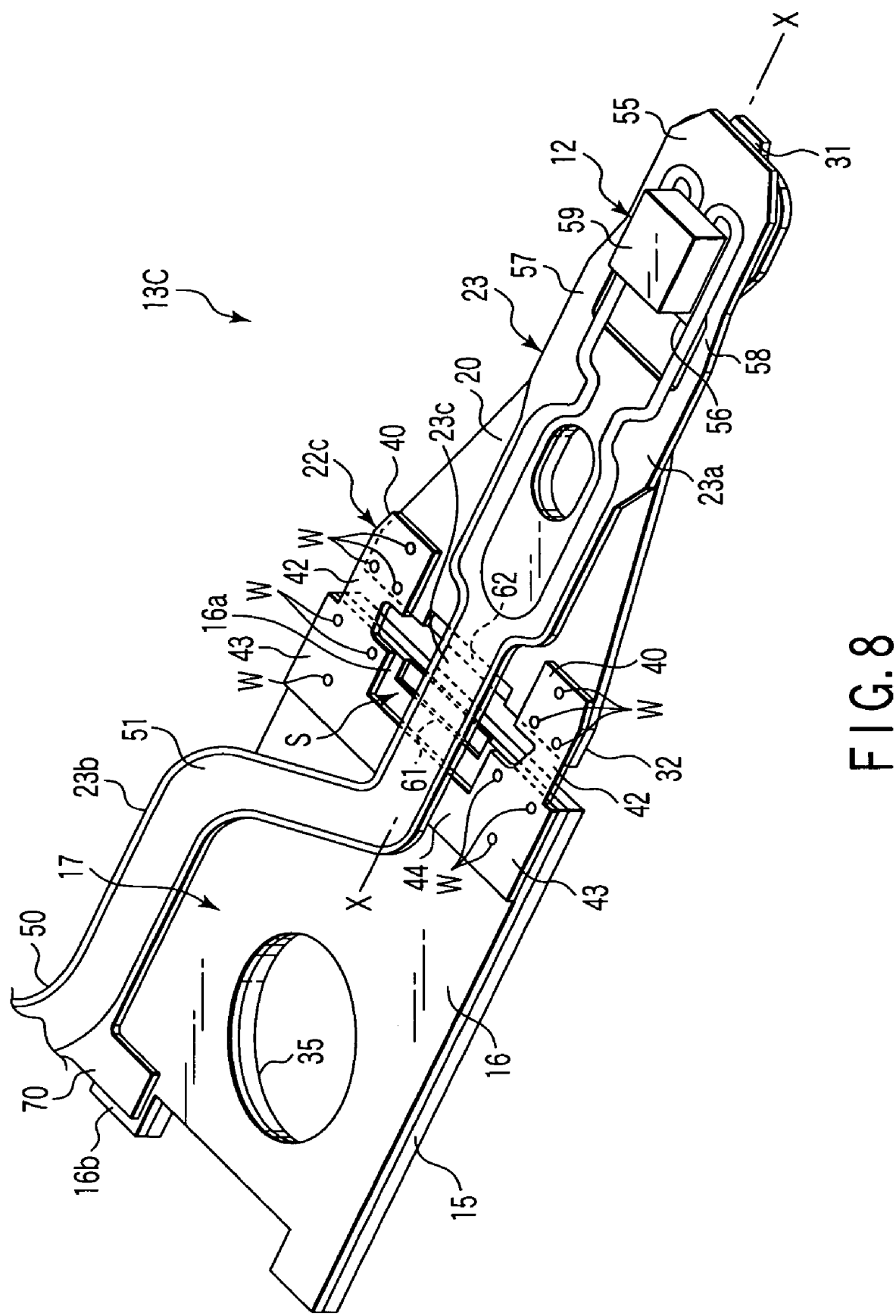
F I G. 8

DISC DRIVE SUSPENSION

CROSS-REFERENCE TO RELATED APPLICATIONS

This application is based upon and claims the benefit of priority from prior Japanese Patent Application No. 2003-205990, filed Aug. 5, 2003, the entire contents of which are incorporated herein by reference.

BACKGROUND OF THE INVENTION

1. Field of the Invention

This invention relates to a disc drive suspension contained in an information processor, such as a personal computer.

2. Description of the Related Art

A hard disc drive (HDD) for recording and reading information to and from a rotating magnetic disc, magneto-optical disc, etc. has a carriage that can turn around a shaft. A positioning motor turns the carriage around the shaft. The carriage comprises an actuator arm, a suspension on the distal end portion of the arm, a head portion including a slider on the suspension, etc.

When the disc rotates, the slider on the distal end portion of the suspension slightly lifts above the surface of the disc, and an air bearing is formed between the disc and the slider. This suspension comprises a base plate, a load beam, a flexure, etc.

In some cases, a flexure with conductors may be located along the load beam. A magnetic head that includes a slider is mounted on the front end portion of the flexure. The flexure with conductors extends from the load beam toward the base plate.

A disc drive suspension shown in FIG. 6 of Jpn. Pat. Appln. KOKAI Publication No. 2001-155458 comprises a base portion including a base plate, a load beam formed independently of the base portion, and a hinge member that connects the load beam and the base portion. A spring portion (region between the load beam and the base portion) of the hinge member can bend in its thickness direction. The spring constant of the spring portion is an essential factor that determines the properties of the suspension.

If the flexure with conductors is lapped on the hinge member in its thickness direction, as in the case of the suspension described above, the spring constant of the whole spring portion including the flexure with conductors sometimes may be much higher than the sum of the respective spring constants of the simple spring portion and the simple flexure.

The reason is that if the flexure with conductors and the hinge member are fixed overlapping each other, the flexure is pulled in its longitudinal direction when the spring portion bends, so that the spring portion cannot bend with ease. If the spring constant of the suspension increases, it may possibly influence the properties of the suspension.

To solve this problem, a layout may be proposed such that the flexure with conductors detours beside the spring portion. With this arrangement, however, the flexure passes on one side of the spring portion, so that the weight distribution in the region near the spring portion is asymmetric. Besides, that part on which the flexure with conductors is not fixed is so long that the flexure with conductors is liable to swing.

Further, the hinge member may possibly be halved in the width direction of the base portion so that the flexure with conductors can be passed between a pair of hinge members. In general, however, a flexure with conductors is thicker than a hinge member. Owing to a difference in bending radius between the flexure and the hinge member that is caused when the spring portion bends, therefore, the flexure touches the front end of the base portion and the rear end of the load beam. Thus, the flexure with conductors is pulled, so that the spring constant of the spring portion increases.

BRIEF SUMMARY OF THE INVENTION

Accordingly, the object of this invention is to provide a disc drive suspension capable of enjoying a low spring constant.

A disc drive suspension according to the invention comprises: a base portion including a baseplate; a load beam formed independently of the baseplate; a pair of hinge members each having a spring portion situated between a front end portion of the base portion and a rear end portion of the load beam and fixed portions fixed overlapping the base portion and the load beam, individually; a flexure with conductors which is located on those sides, obverse or reverse, of the base portion and the load beam on which the hinge members are lapped, passes between the hinge members, and ranges over the load beam and the base portion; and a recess formed on that region of the front end portion of the base portion which faces the flexure with conductors and/or a recess formed on that region of the rear end portion of the load beam which faces the flexure with conductors.

According to this arrangement, the spring constant of the disc drive suspension having the hinge members and the flexure with conductors can be lowered, that is, the suspension can be obtained having a desired low spring constant. The hinge member may have a pair of spring portions and a connecting portion that connects the spring portions. Preferably, the recess on the base portion is a thin-walled portion formed by reducing the thickness of a part of the front end portion of the base portion, and the recess on the load beam is a thin-walled portion formed by reducing the thickness of a part of the rear end portion of the load beam.

According to another aspect of the invention, the recess on the base portion is a notch formed on the front end of the base portion, and the recess on the load beam is a notch formed on the rear end of the load beam. These recesses may be formed only on the base portion or on the load beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of a disc drive suspension according to a first embodiment of the invention;

FIG. 8 is a perspective view of a disc drive suspension according to a fifth embodiment of the invention.

DETAILED DESCRIPTION OF THE INVENTION

A first embodiment of this invention will now be described with reference to FIGS. 1 to 3.

Figure 3:
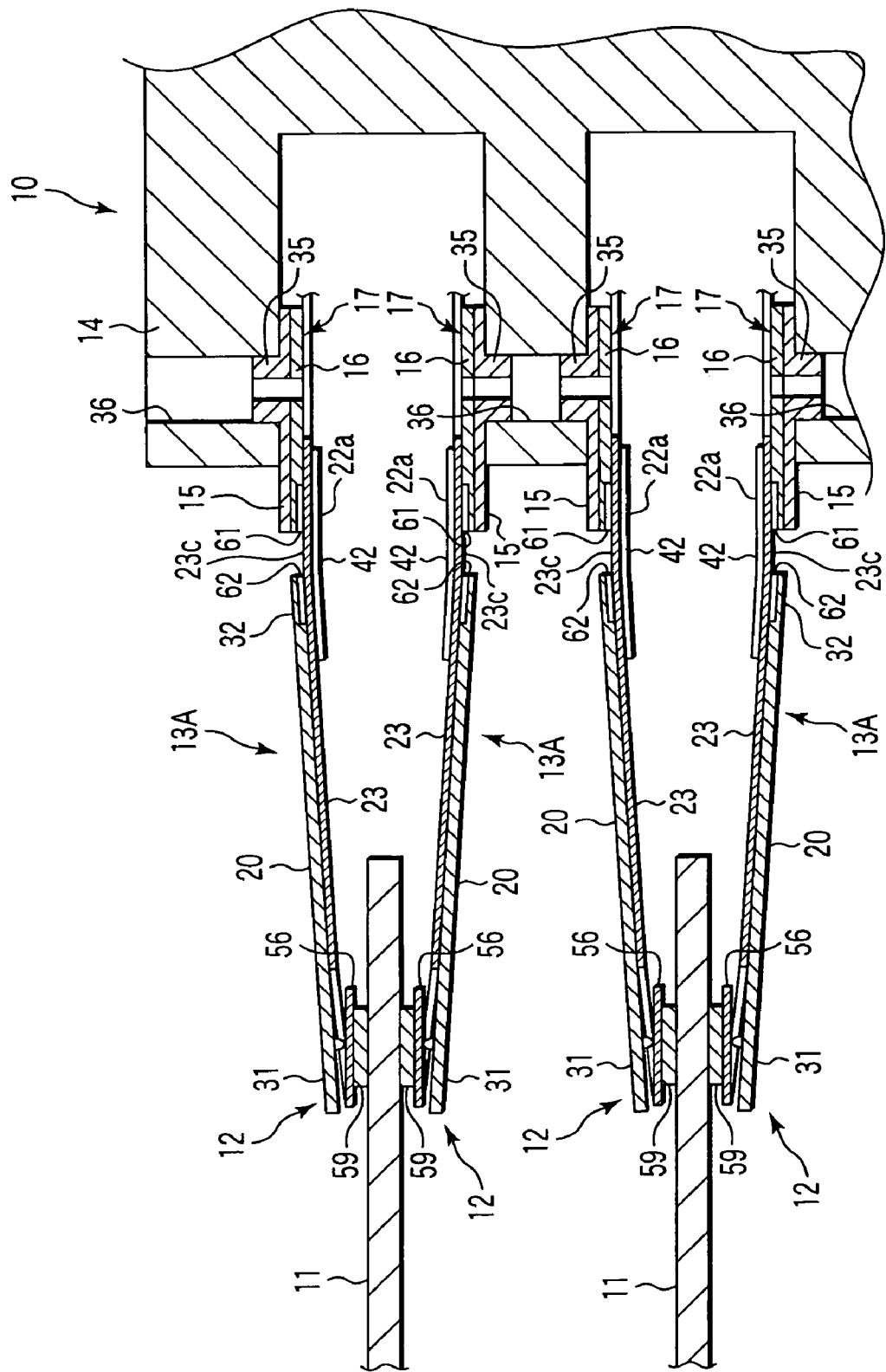
FIG. 3 is a sectional view of a part of a disc drive with the suspension shown in FIG. 1.

A hard disc drive (HDD) 10 shown in FIG. 3 comprises discs 11 for use as recording media, disc drive suspensions 13A, arms (actuator arms) 14, etc.

Each suspension 13A has a head portion 12 for magnetically recording on and reading information from an information surface of each disc 11. The suspensions 13A are mounted on the arms 14. The arms 14 are turned around a shaft (not shown) by a positioning motor (not shown).

Figure 2:
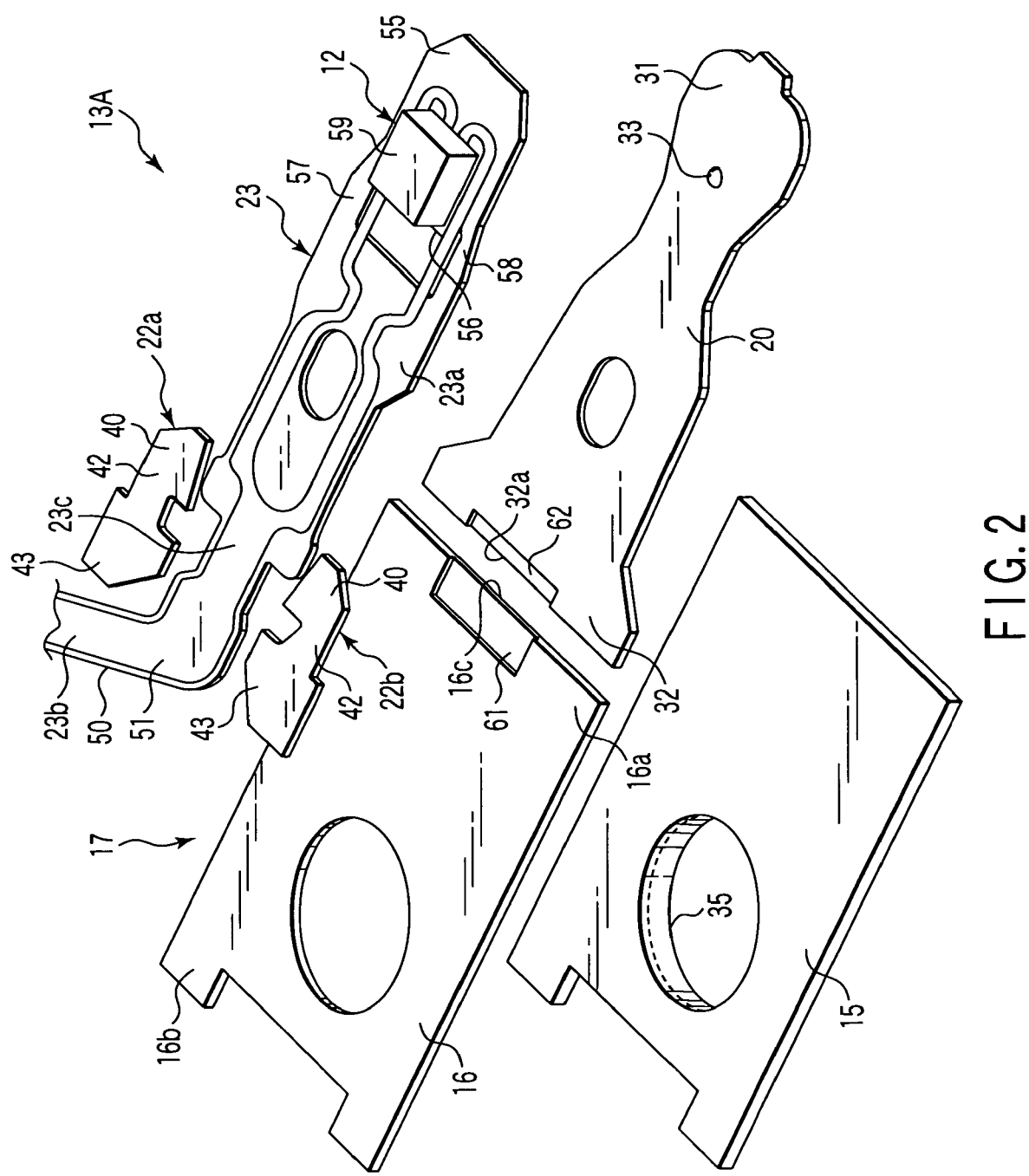
FIG. 2 is an exploded perspective view of the disc drive suspension shown in FIG. 1.

As shown in FIGS. 1 and 2, each suspension 13A has a base portion 17, a load beam 20, a pair of hinge members 22a and 22b, flexure 23 with conductors, etc. The load beam 20 is formed independently of a baseplate 15. The hinge members 22a and 22b are independent of each other and spaced in the width direction of the base portion 17. The flexure 23 with conductors is mounted on the load beam 20. The flexure 23 extends along the beam 20.

The base portion 17 is composed of the baseplate 15 and a plate member 16 that overlap each other in their thickness direction. The thickness of the plate member 16 is equal to that of the load beam 20. The plate member 16 is formed of the same material (e.g., stainless steel) as the load beam 20. The plate member 16 and the load beam 20 are situated substantially flush with each other.

The load beam 20 has a front end portion 31 and a rear end portion 32. A dimple 33 is formed near the front end portion 31 of the load beam 20. The load beam 20 has a thickness of about 60 to 100 µm, for example. In general, the baseplate 15 is thicker than the load beam 20. Its thickness ranges from about 150 to 200 µm, for example.

A cylindrical boss portion 35 is formed on the baseplate 15. As shown in FIG. 3, the boss portion 35 is inserted in a fitting hole 36 of each corresponding arm 14. The baseplate 15 is fixed to the arm 14 by crimping (or plastically deforming) the boss portion 35 from inside.

Each of the hinge members 22a and 22b has a fixed portion 40, spring portion 42, and fixed portion 43. The fixed portion 40 is fixed to the rear end portion 32 of the load beam 20 in an overlapping manner. The spring portion 42 is situated between the baseplate 15 and the load beam 20. The fixed portion 43 is fixed to a front end portion of the base portion 17 (or a front end portion 16a of the plate member 16) in an overlapping manner. In FIG. 1, symbol W denotes spot welds that are formed by irradiation with laser beams or the like.

The hinge members 22a and 22b are thinner than the load beam 20. Their thickness ranges from about 25 to 40 µm, for example. The respective spring portions 42 of the hinge members 22a and 22b can bend their thickness direction. These spring portions 42 are situated between the base portion 17 and the load beam 20.

The hinge members 22a and 22b are arranged substantially symmetrically with respect to an axis X that extends along the longitudinal direction of the load beam 20. However, they may be somewhat different in shape. In short, the hinge members 22a and 22b must only be shaped so that lateral moments of inertia that are generated near them are balanced when the load beam 20 is twisted around the axis X.

The flexure 23 with conductors includes a main portion 23a and an extending portion 23b. The main portion 23a extends along the axis X of the load beam 20. The extending portion 23b extends along the baseplate 15 to a region behind the boss portion 35. The flexure 23 is located on those sides, obverse or reverse, of the base portion 17 and the load beam 20 on which the hinge members 22a and 22b are arranged. A longitudinally intermediate portion 23c of the flexure 23 passes through a gap S between the hinge members 22a and 22b and extends in the direction of the axis X of the load beam 20.

The main portion 23a of the flexure 23 with conductors is fixed in given position on the load beam 20 by laser welding or adhesive bonding. The extending portion 23b of the flexure 23 passes through the gap S between the hinge members 22a and 22b and extends toward the baseplate 15.

The flexure 23 with conductors has a metal base 50 and a wiring portion 51. The metal base 50 is formed of a springy stainless-steel sheet with a thickness of about 18 to 25 µm. The wiring portion 51 is formed on the metal base 50. It includes a reading conductor and a writing conductor (neither of which is shown). The reading and writing conductors overlie the metal base 50 with an electrically insulating layer between them. In general, therefore, the flexure 23 is thicker than the hinge members 22a and 22b.

A tongue portion 56 and outrigger portions 57 and 58 are formed near a distal end portion 55 of the flexure 23 with conductors. The tongue portion 56 functions as a movable portion. The outrigger portions 57 and 58 are situated individually on the laterally opposite sides of the tongue portion 56. The tongue portion 56 and the outrigger portions 57 and 58 form a part of the metal base 50 each. The tongue portion 56 is designed to engage the dimple 33 (shown in FIG. 2) on the load beam 20. If the outrigger portions 57 and 58 bend in the thickness direction of the flexure 23, the tongue portion 56 can freely move around the dimple 33.

The tongue portion 56 is fitted with a slider 59 that forms the head portion. The slider 59 is provided with a transducer (not shown) for use as a magneto-electric transducer. The transducer, slider 59, etc. constitute the head portion 12.

A supported portion 70 is formed on a longitudinal part of the extending portion 23b of the flexure 23 with conductors. It is formed by extending a part of the metal base 50 of the flexure 23 sideways. The supported portion 70 is put on a rear end portion 16b of the plate member 16 of the base portion 17 and fixed to the plate member 16 by fixing means such as layer welding.

As shown in FIG. 2, a thin-walled portion 61 is formed as a first recess on the front end portion 16a of the plate member 16. The thin-walled portion 61 is formed by partial etching such that the thickness of that region of the front end portion 16a of the plate member 16 which faces the flexure 23 with conductors is reduced. The thin-walled portion 61 is formed along the flexure 23 so as to extend inward from a front end 16c of the plate member 16.

A thin-walled portion 62 is formed as a second recess on the rear end portion 32 of the load beam 20. The thin-walled portion 62 is formed by partial etching such that the thickness of that region of the rear end portion 32 of the load beam 20 which faces the flexure 23 with conductors is reduced. The thin-walled portion 62 is formed along the flexure 23 so as to extend inward from a rear end 32a of the load beam 20.

Thus, the thin-walled portions 61 and 62 are formed on the base portion 17 and the load beam 20, respectively. With this arrangement, the thin-walled portions 61 and 62 can prevent the flexure 23 with conductors from engaging the front end 16c of the plate member 16 and the rear end 32a of the load beam 20 as the spring portions 42 bend. According to the suspension 13A of this embodiment, compared with one that is not formed with the thin-walled portions 61 and 62, tensile stress that is generated in the flexure 23 is reduced, and the spring portions 42 can bend more easily.

The first thin-walled portion 61, out of the two thin-walled portions 61 and 62, serves more effectively to lower the spring constant of a part at which the flexure 23 with conductors and the spring portions 42 cooperate with one another. This is probably because the hinge members 22a and 22b bend mostly in positions closer to the base portion 17.

Accordingly, the thin-walled portion 61 is expected to be formed at least on the base portion 17. Since the thin-walled portion 62 on the load beam 20 also has some effect to lower the spring constant, however, at least one of the thin-walled portions 61 and 62 must only be formed.

In the suspension 13A of this embodiment, the longitudinally intermediate portion 23c of the flexure 23 with conductors passes through the gap S between the hinge members 22a and 22b. Thus, the shape of regions near the spring portions 42 is substantially symmetrical with respect to the axis X. If the load beam 20 swings in its thickness direction, therefore, the load beam 20 and the baseplate 15 cannot easily urged to twist.

Further, the hinge members 22a and 22b are independent of each other, and the gap S is defined between them. More specifically, the small hinge members 22a and 22b exist only on a part of the base portion 17 in its width direction. Thus, the mass of the hinge members 22a and 22b can be made smaller than in the conventional case where the hinge member has a width substantially equal to that of the base portion. If the mass of the hinge members 22a and 22b is small, the seek time of the disc drive 10 can be shortened favorably.

Figure 4:
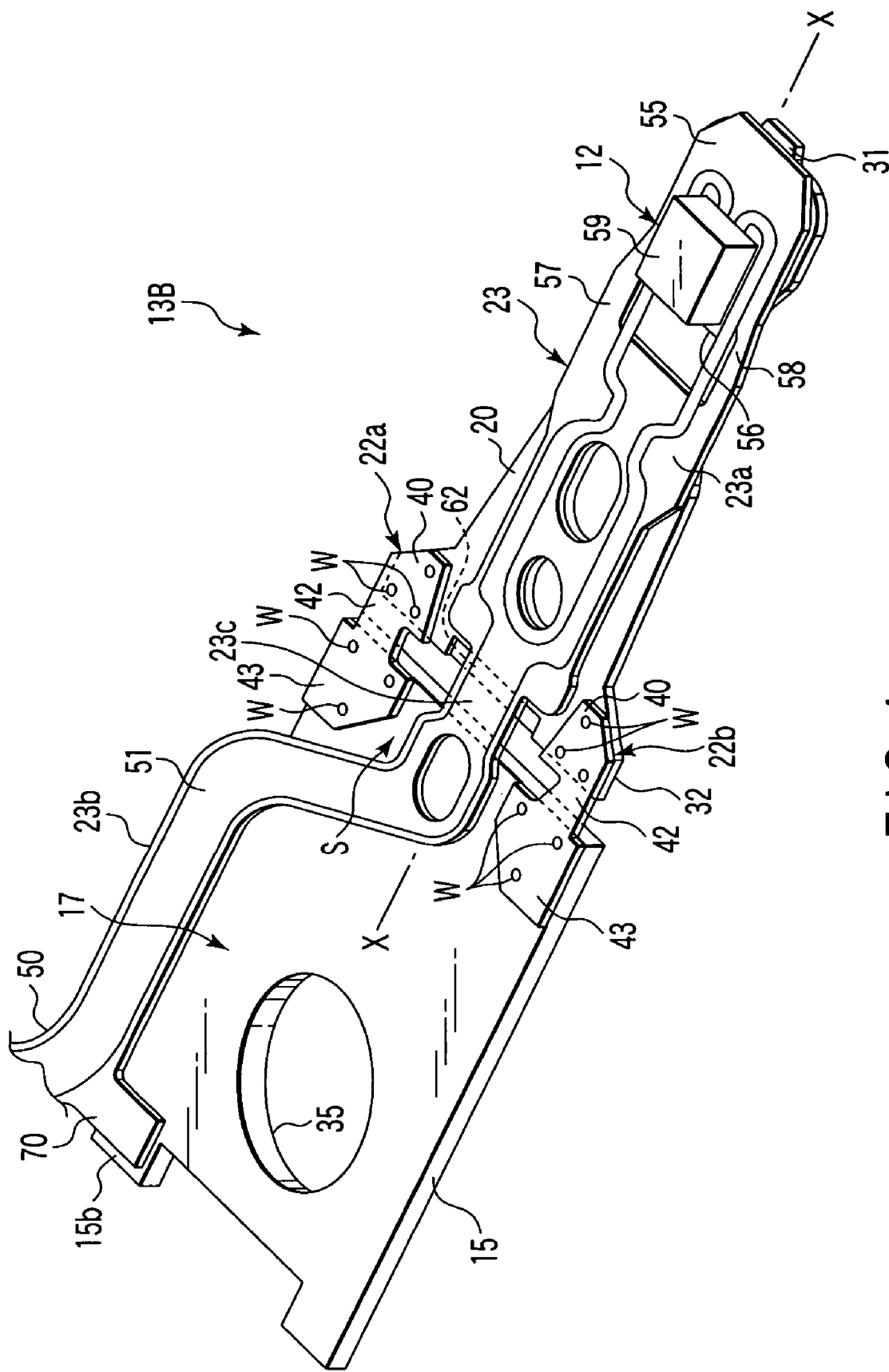
FIG. 4 is a perspective view of a disc drive suspension according to a second embodiment of the invention.
Figure 5:
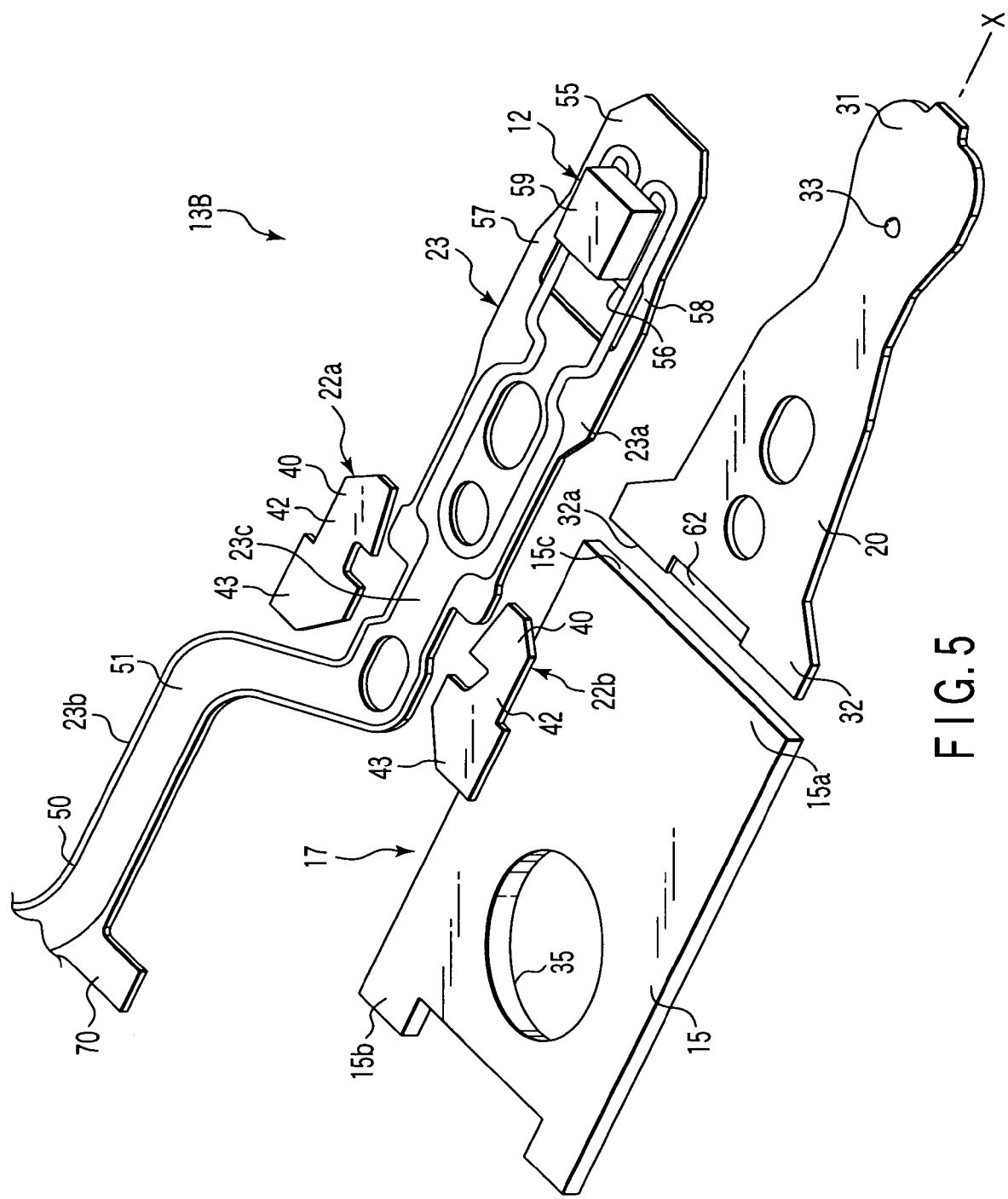
FIG. 5 is an exploded perspective view of the disc drive suspension shown in FIG. 4.

FIGS. 4 and 5 show a disc drive suspension 13B according to a second embodiment of the invention. A base portion 17 of the suspension 13B is composed of a baseplate 15.

A thin-walled portion 62 is formed on that region of a rear end portion 32 of a load beam 20 which faces a flexure 23 with conductors. As shown in FIG. 5, the thin-walled portion 62 is formed by reducing the thickness of a part of the rear end portion 32 of the load beam 20 by partial etching. The suspension 13B shares other configurations and functions with the suspension 13A of the first embodiment. Therefore, like reference numerals are used to designate common parts of the two suspensions 13A and 13B, and a repeated description of those parts is omitted.

Figure 6:
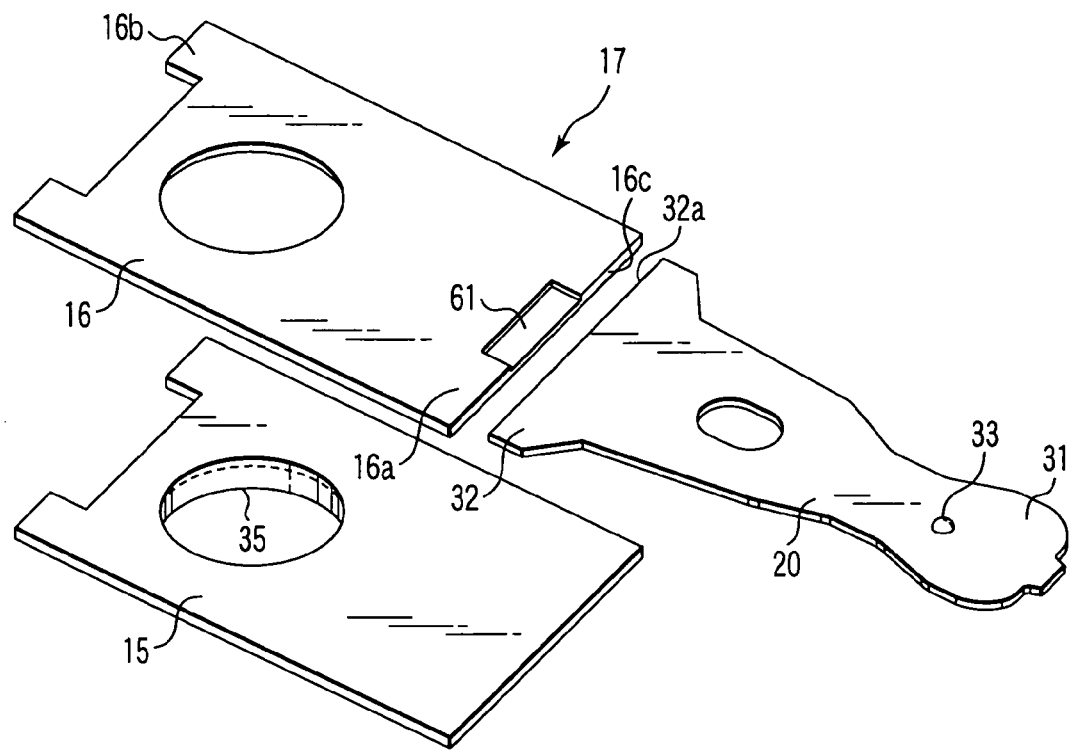
FIG. 6 is an exploded perspective view of a part of a disc drive suspension according to a third embodiment of the invention.

In a third embodiment shown in FIG. 6, a thin-walled portion 61 is formed only on a plate member 16 that constitutes a base portion 17 by partial etching, no thin-walled portion is formed on a load beam 20. This embodiment shares other configurations with the first embodiment.

Figure 7:
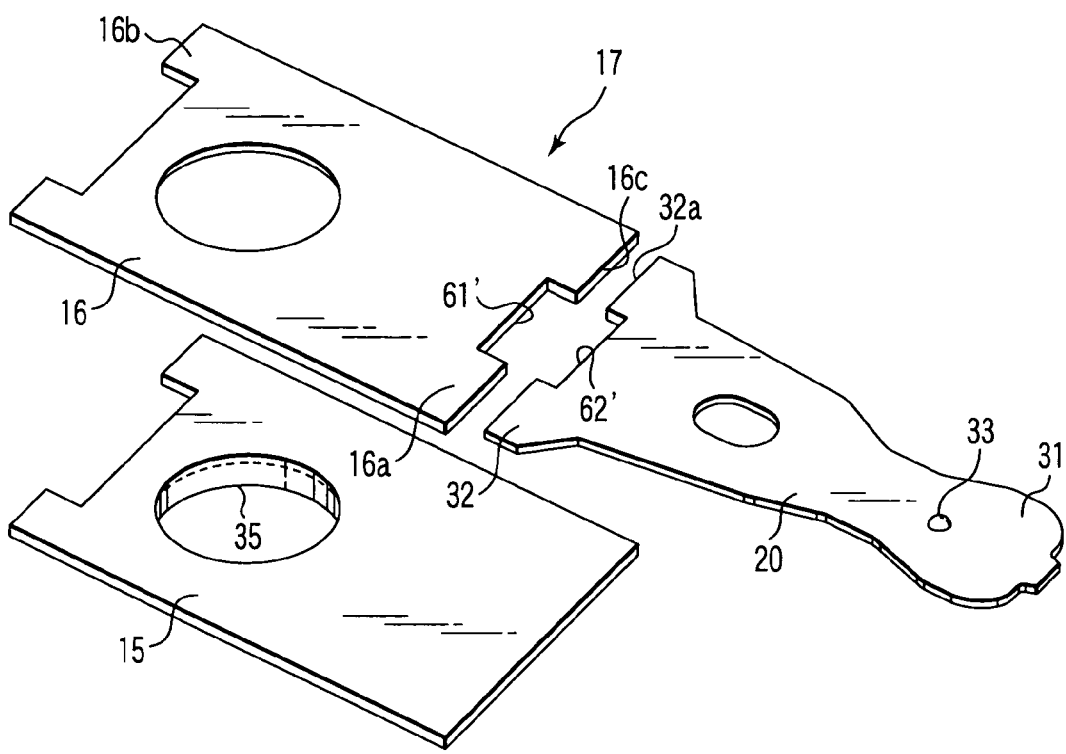
FIG. 7 is an exploded perspective view of a part of a disc drive suspension according to a fourth embodiment of the invention.

In a fourth embodiment shown in FIG. 7, a notch 61' is formed as a first recess on a plate member 16 of a base portion 17, and a notch 62' as a second recess on a load beam 20. The first notch 61' is formed on that region of a front end 16c of the plate member 16 which faces the flexure 23 with conductors. The second notch 62' is formed on that region of a rear end 32a of the load beam 20 which faces the flexure 23. This embodiment shares other configurations with the first embodiment.

FIG. 8 shows a disc drive suspension 13C according to a fifth embodiment of the invention. A hinge member 22c of the suspension 13C has a pair of spring portions 42 and a connecting portion 44 that integrally connects the spring portions 42. A longitudinally intermediate portion 23c of a flexure 23 with conductors passes between the two spring portions 42. The suspension 13C shares other configurations and functions with the suspension 13A of the first embodiment. Therefore, like reference numerals are used to designate common parts of the two suspensions 13A and 13C, and a repeated description of those parts is omitted.

It is to be understood, in carrying out this invention based on the embodiments described above, that the components of the invention, including the respective configurations of the base portion, the load beam, flexure with conductors, hinge members, and recesses, may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:
   a base portion including a baseplate;
   a load beam formed independently of the baseplate;
   a hinge member having a pair of spring portions situated between a front end portion of the base portion and a rear end portion of the load beam and fixed portions fixed overlapping the base portion and the load beam, individually;
   a flexure with conductors which is located on those sides, obverse or reverse, of the base portion and the load beam on which the hinge member is lapped, passes between the spring portions, and ranges over the load beam and the base portion, and
   a recess formed on that region of the front end portion of the base portion which faces the flexure with conductors; and/or a recess formed on that region of the rear end portion of the load beam which faces the flexure with conductors.

2. A disc drive suspension according to claim 1, wherein the recess on the base portion is a thin-walled portion formed by reducing the thickness of a part of the front end portion of the base portion, and the recess on the load beam is a thin-walled portion formed by reducing the thickness of a part of the rear end portion of the load beam.

3. A disc drive suspension according to claim 1, wherein the recess on the base portion is a notch formed on the front end of the base portion, and the recess on the load beam is a notch formed on the rear end of the load beam.

* * * * *